United States Patent
Washburn et al.

(10) Patent No.: US 10,242,593 B2
(45) Date of Patent: Mar. 26, 2019

(54) INSTRUMENT SKILL INSTRUCTION AND TRAINING SYSTEM

(71) Applicant: DH Cubed, LLC, Seattle, WA (US)

(72) Inventors: Tyler Francisco Washburn, Bothell, WA (US); Deborah McGlynn, Seattle, WA (US)

(73) Assignee: DH Cubed, LLC, Seattle, WA (US)

( * ) Notice: Subject to any disclaimer, the term of this patent is extended or adjusted under 35 U.S.C. 154(b) by 276 days.

(21) Appl. No.: 14/862,276

(22) Filed: Sep. 23, 2015

(65) Prior Publication Data

US 2016/0086514 A1 Mar. 24, 2016

Related U.S. Application Data

(60) Provisional application No. 62/054,895, filed on Sep. 24, 2014.

(51) Int. Cl.
*G09B 19/24* (2006.01)
*G09B 23/28* (2006.01)

(52) U.S. Cl.
CPC ........... *G09B 19/24* (2013.01); *G09B 23/283* (2013.01)

(58) Field of Classification Search
CPC ............................. G09B 19/24; G09B 23/283

USPC .......................................................... 434/219
See application file for complete search history.

(56) References Cited

U.S. PATENT DOCUMENTS

| | | | | |
|---|---|---|---|---|
| 5,197,227 A * | 3/1993 | Svanberg | ................. | A61C 3/00 451/278 |
| 5,793,493 A * | 8/1998 | Lane | ...................... | G01B 11/24 356/613 |
| 8,915,766 B1 * | 12/2014 | Kolchin | .................... | B24B 3/54 451/45 |

* cited by examiner

*Primary Examiner* — Robert P Bullington

(57) ABSTRACT

Technology is described for a system to provide skill training in various fields, including professional fields involving hand-held instruments. The system senses a user's manipulation of an instrumented work piece, handheld instrument or tool using various sensors, e.g., for a dental tool, an array of pressure sensors in the instrumented work piece and/or the tool's tip, grip sensors, and sensors to track the position and movement of the tool and/or work piece relative to each other. The system includes lessons to train users in the proper methods to manipulate the instrumented work piece and/or the tool and provides guidance and feedback based on the user's performance to build the user's skills, prevent injury, and document competency.

16 Claims, 15 Drawing Sheets

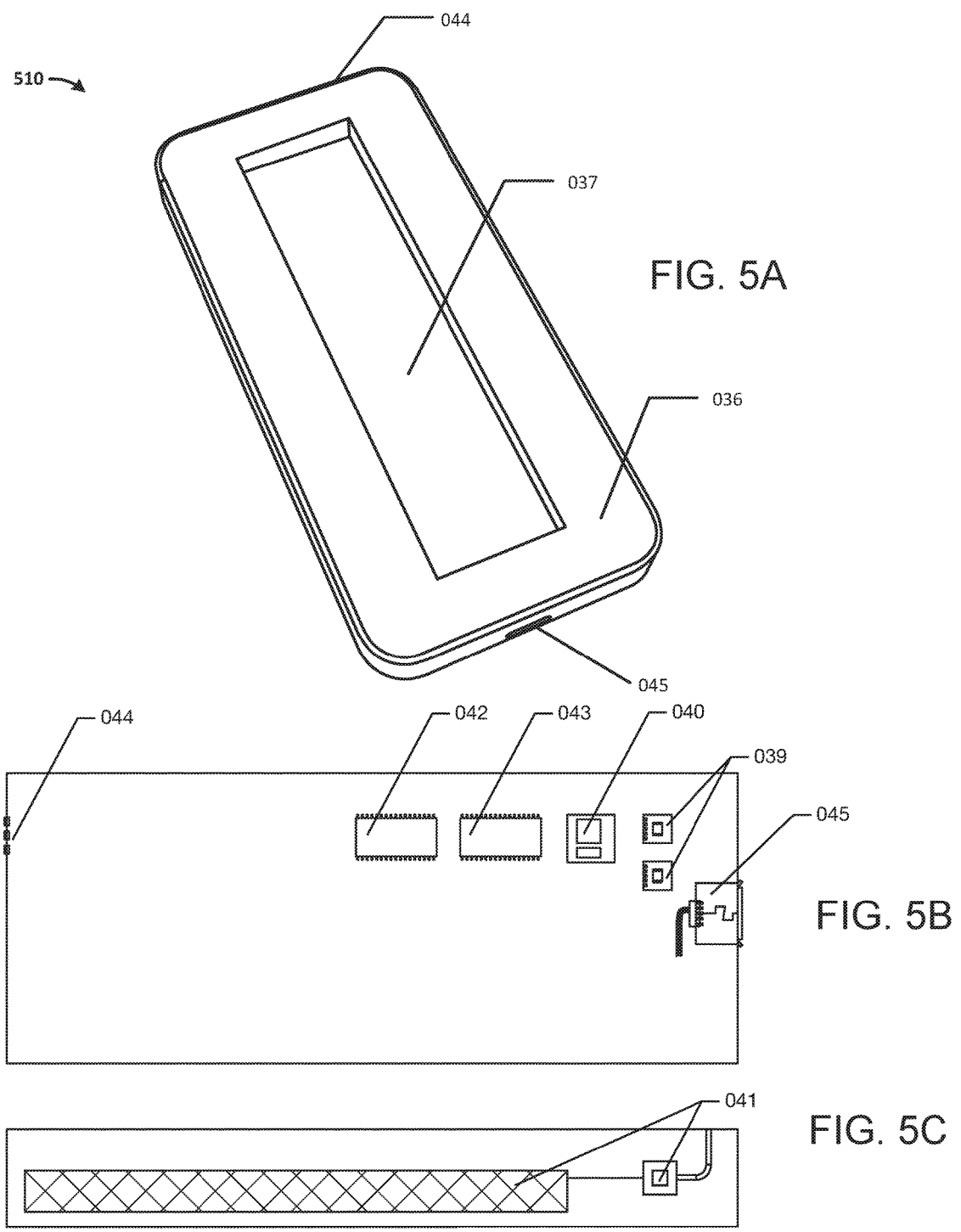

INSTRUMENT SKILL INSTRUCTION AND TRAINING SYSTEM

RELATED APPLICATIONS

This application is related to and claims priority to U.S. Provisional Patent Application No. 62/054,895 filed Sep. 24, 2014, titled "Instrument Skill Instruction and Training System," as well as U.S. Provisional Patent Application No. 61/779,102 filed Mar. 13, 2013, titled "Method, System and Apparatus for Professional Skill Instruction and Training," and U.S. Non-Provisional patent application Ser. No. 14/210,412 filed Mar. 13, 2014, titled "Instrument Skill Instruction and Training System," all of which are incorporated by reference in their entirety.

TECHNICAL FIELD

This disclosure relates to embodiments of an apparatus, method, and system of skill training in various fields, including professional fields involving hand-held instruments, for training users in the proper methods to build their skills and document their competency in the training material.

SUMMARY

In some embodiments, the technology disclosed herein includes a skill training apparatus comprising a handheld instrument and a computer-readable storage medium. The handheld instrument may have a plurality of sensors, including at least one sensor for detecting the orientation of the instrument and at least one sensor for detecting contact with the instrument. The handheld instrument may be operatively coupled to a processor, such that the processor can receive sensor data about the detected orientation of the handheld instrument and detected contact with the handheld instrument. The computer-readable storage medium may include a data structure containing information characterizing proper orientation of the handheld instrument and contact with the handheld instrument, and instructions configured to cause the processor to compare sensor data about the detected orientation of the handheld instrument and detected contact with the handheld instrument to data structure information characterizing proper orientation of the instrument and contact with the handheld instrument, as well as instructions configured to cause the processor to provide, through an output device operatively coupled to the processor, feedback based on comparison of the sensor data to data structure information.

In some embodiments, the technology disclosed herein includes a system for assisting in skill training when operatively coupled to at least one processor. The system may comprise an implement substantially having the form of a professional tool, means for sensing manipulation of the implement by a user, and at least one memory storing computer-executable instructions executable when operatively coupled to the processor. The computer-executable instructions may include various components, such as a component configured to convey to a user information describing skilled manipulation of the implement; a component configured to detect, via the sensing means, the user's manipulation of the implement; a component configured to collect information about the detected user manipulation of the implement; a component configured to identify, based on the collected information, improper user manipulation of the implement; and a component configured to convey to the user feedback regarding the improper user manipulation of the implement.

In some embodiments, the technology disclosed herein includes a computer-readable storage medium having contents configured to cause at least one computing device having a processor to perform a method for professional user skill training. The method may comprise receiving a lesson plan for training the user in a professional skill, wherein the professional skill includes handling of an instrument used in the profession; presenting at least a portion of the lesson plan to a user; prompting the user to attempt to perform at least a portion of the professional skill, wherein performing the at least a portion of the professional skill includes handling the instrument; obtaining information characterizing the user's handling of the implement in the user's attempt to perform the at least a portion of the professional skill; evaluating, by the processor, the information characterizing the user's handling of the implement; determining, based on the evaluation, whether the user's attempt to perform the at least a portion of the professional skill was successful; and if the user's attempt to perform the at least a portion of the professional skill was not successful, conveying, on an output device, feedback regarding the user's handling of the implement.

BRIEF DESCRIPTION OF DRAWINGS

The present disclosure will be better understood, and aspects other than those set forth above will become apparent, when consideration is given to the following detailed description, which makes reference to the drawings:

FIG. 5A is a schematic isometric view of an instrumented work piece useable with the handheld device or tool in accordance with an embodiment of the present technology.

FIG. 5B is a schematic internal plan view of the instrumented work piece of FIG. 5A illustrating some internal components within the work piece.

FIG. 5C is a schematic view of the instrumented work piece of FIG. 5A showing a power source and/or control or regulator circuitry.

DETAILED DESCRIPTION

Overview

Figure 1A:
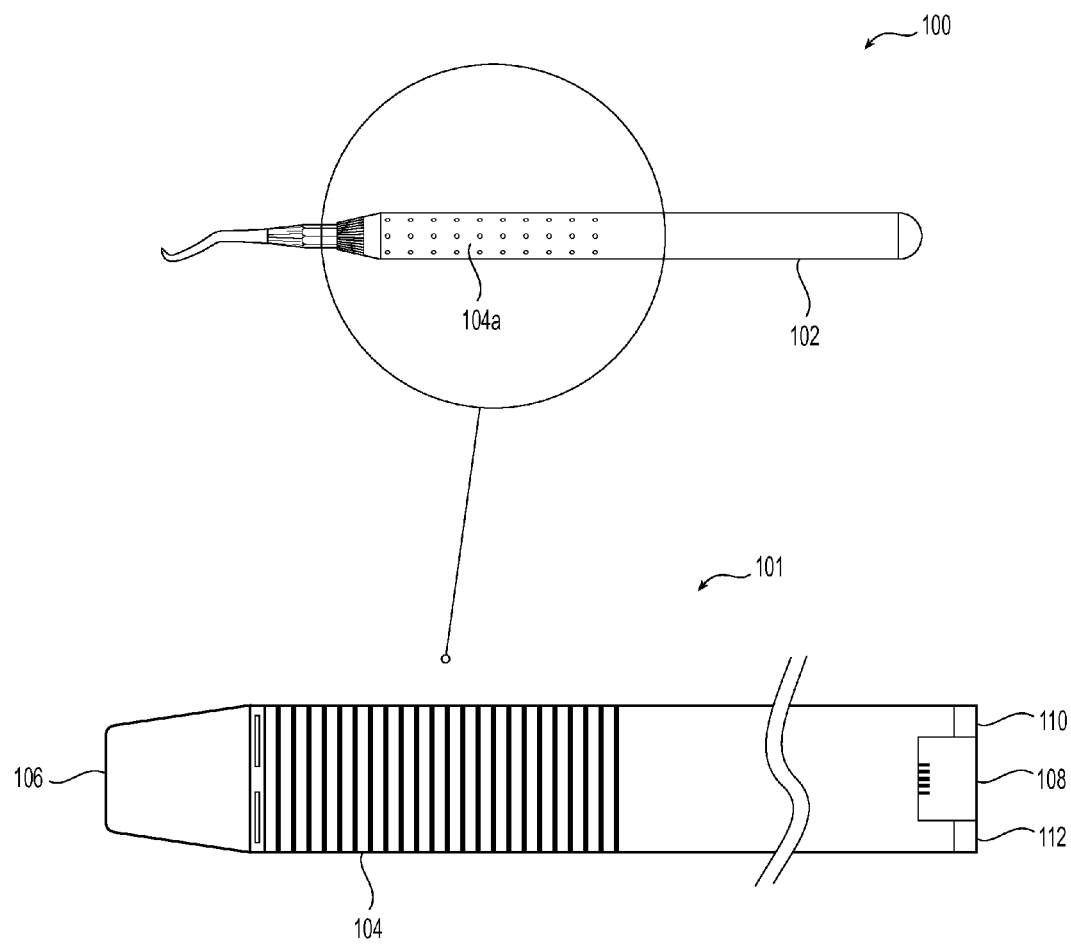
FIG. 1A is a plan view illustrating external components of an example assembly in the form of a dental tool in accordance with embodiments of the present disclosure.

The inventors have recognized that a new approach to skill training that is faster, less expensive, and more convenient than traditional approaches would have significant utility. An apparatus, method, and/or system in accordance with the present disclosure (an embodiment of "the technology" including software and/or hardware) helps train users in various skills and skillsets, particularly skillsets involving handheld implements and instruments. The technology allows users to achieve higher levels of skill and implement those skills more quickly than possible through traditional approaches. By using the technology, users can develop proper skills faster and with fewer errors, helping them successfully enter into or continue in their professional fields.

Professional longevity through proper ergonomic or safety protocols is also a benefit of various embodiments of the technology. For example, embodiments of the technology help users to identify and learn proper ergonomic instrument orientation, handling, and manipulation, to understand what corrections to make in their skills, and to apply corrections immediately in a simulated environment in order to prevent potential injury. Using the technology (including, e.g., an application, a training tool, and a simulated environment) can help users develop and perfect techniques needed to take their learned skills with them into the field after instruction has completed, thereby increasing the longevity of their careers.

Other benefits of various embodiments of the technology include reduced cost and increased availability of skill training. Higher professional education and vocational training are expensive, and users and institutions look for ways to cut costs. The technology can lower overall professional educational costs by reducing the amount and length of training needed to build skills, by providing lessons that develop correct technique in a simulated environment to practice on. The technology thus decreases the student's and/or institution's cost by reducing the time needed to get and/or provide quality training. The technology can also augment worldwide availability of quality skill-improvement education, e.g., providing training where traditional instructional resources are rare or difficult to access.

Various embodiments of the technology address such issues and provide such benefits with respect to professional training by providing an apparatus, method, and/or system for training users in the understanding and use of professional devices, including providing documentation of competency during or after a training exercise. The technology can also be used to augment worldwide availability of quality professional education. For example, in developing countries, nurses who do not have access to specialized dental hygiene instruction could learn basic techniques and professional skills to improve dental health in their community.

An apparatus in accordance with one or more embodiments of the technology includes a handheld device with interchangeable tips, either free standing, or connected to a base unit, which contains one or more of various sensor technologies. For example, in various embodiments, sensors are included in one or more of the body, the tip (or tips), a connected base unit, a remote sensor or scanner unit, or any combination or all of the above, which transmit sensor data (including, e.g., positional, directional, and sensory feedback data) information to the software (e.g., wirelessly or by a wired connection), providing the user with real time feedback about their correct use of a professional tool or instrument in a given professional application. Means for sensing manipulation of the implement by a user include all of the sensor technologies described in this disclosure and their equivalents.

The method of the present disclosure is useable in connection with various computing devices, e.g., a television, computer laptop, desktop, station, terminal, tablet, phone, PDA, wearable computer, or other personal computing device. Software on the computing device, for example, can provide the user via a personal computing display device with a visual representation of their applicable professional environment and current lesson plan. An apparatus incorporating the technology provides data feedback to the software to facilitate the user interaction with the training software. Using a method as described herein, the user is able to access, load, and start a module or lesson plan relevant to his or her professional field or area of study. The lesson plans or modules present the user with, for example, a simulated 3D environment where the user may use the above-mentioned apparatus to manipulate or interact with a 3D image on the screen in order to complete a given scenario correctly. For example, the user could begin a lesson describing how to sharpen an instrument properly. The software depicts an image of a virtual dental tool, based on positional data gathered from the apparatus in the user's hand. When the user moves a replica sharpening stone against the hand held apparatus, the images on screen are able to mimic the movements of the apparatus and display a result indicating proper or improper sharpening technique. The technology in this example describes proper technique, use, and information about the given professional lesson and situation, tracks the user's progress through a lesson, and gives the user a documented result of competency in the lesson or module after it has been completed. The user is able to retake competency checks and revisit lessons or modules at his or her discretion or as indicated by an instructor.

A system for teaching proper technique and skillsets in a variety of professional scenarios in accordance with embodiments of the technology includes a hand held interface apparatus to provide input, and electronic sensor data information, and a computer program to allow the user to interact with professional lesson plans or modules that are made up of real world examples (e.g., 3D scenarios) to train or improve professional skillsets. For example, an electronic hand held device modeled after a surgical instrument interacts with a medical lesson (e.g., a scalpel for a particular surgical procedure) on the computing device (e.g., a television, computer laptop, desktop, station, terminal, tablet, phone, PDA, wearable computer, or other personal computing device) and uses sensor hardware in the device to provide real time feedback for the user interacting with the software to train or improve professional skills. Features of the embodiments can be implemented in numerous ways, including as a system, a method, an apparatus, or a computer readable medium such as a hard drive, disk, read-only or rewriteable memory, or other storage device. Aspects of the system may utilize a communication infrastructure, for example, a broadband connection, Wi-Fi network, Bluetooth short range wireless, near-field communication (NFC), Universal Serial Bus (USB), Ethernet, or other local area network for centralized control or remote activity. As a computer system the technology can include or interacts with special purpose hardware or a general use processor unit with associated hardware and associated display device such as a standard desktop computer and display monitor. As a computer readable medium containing program instructions for providing interactive training, an embodiment of the technology includes computer readable code to provide a training module or professional lesson plan. Part or all of the training session or results can be stored locally or sent electronically and maintained on a remote computing device (e.g., a secure Web server) for confidential access (e.g., through secure authentication using a typical Web browser).

Embodiments of the present disclosure provide a user friendly, easy to understand, three-dimensional, responsive, interactive hardware and/or software package that brings professional skillset training designed to facilitate simulated hands on instruction for proper technique and professional injury prevention to the user. For example, the technology encompasses a dental training program designed to reduce work-related injury in the dental field by teaching proper techniques.

Description of Figures

Several embodiments of the technology are described in more detail in reference to the Figures. Embodiments in accordance with the present disclosure are set forth hereinafter to provide a thorough understanding and enabling description of a number of particular embodiments. Numerous specific details of various embodiments are described below. In some instances, well-known structures or operations are not shown, or are not described in detail to avoid obscuring aspects of this technology. A person skilled in the art will understand, however, that the technology may have additional embodiments, or that the technology may be practiced without one or more of the specific details of the embodiments as shown and described.

Aspects of the present disclosure address needs in professional training by providing a hands-on module-based training system with contextually specific hand-held input hardware for training users in the understanding and use of professional devices in specialized fields such as, e.g., dental hygiene. In the illustrated examples, the technology utilizes a client/server environment to provide module-based lessons to run on devices such as a laptop, desktop PC, or microcontroller. The user uses custom task-specific input hardware in a hand-held format, operating with the software to allow the user to interact with and complete the training modules.

The following discussion provides an illustrative example of the technology and components in connection with dental tools and procedures. It is noted, however, that the technology is not limited to dental tools and procedures, and the technology is applicable to other handheld tools, components, procedures, systems, and methods.

FIG. 1A is a plan view illustrating external components of an example assembly in the form of a dental tool in accordance with an embodiment of the present disclosure. The hand held dental tool or device 100 includes a body 102, which holds various components in an external hardware casing. In this example device 100, the casing is shaped to closely resemble a periodontal scaler or curette. The device 100 can vary in size and shape depending on the professional training being provided. The example form factor is designed for the technology to provide dental skill training. By having the device 100 approximate or replicate a particular tool design, the technology provides the most relevant training experience to a user.

The device 100 has a tip portion and an intermediate gripping portion 104a that the user grips during use. In the illustrated embodiment, the device 100 can have bumps, dimples, ridges, or other grip enhancing features. The expanded view 101 of the body 102 shows various example components of the body 102. The grip portion 104a has a pressure sensor membrane or area 104 (which may or may not be attached or integrated into the main body of the hand held device) that allows the technology to measure finger or grip position, strength, or tension. An attachment point 106 allows an interchangeable tip 136 (shown, e.g., in FIG. 4A) to be attached to the body 102. A data and/or power connection port 108 permits powering of the device 100 or charging of a battery to power the device 100, as well as enabling data to be uploaded to or downloaded from the device 100. For example, power connection port 108 may be a micro USB port for transmitting sensor data to an attached base station or an external computer running associated training software. A connection status LED 110 conveys information about the status of a data connection to the device 100, and a battery level LED 112 conveys information about the strength of charge of a battery powering the device 100.

Figure 1B:
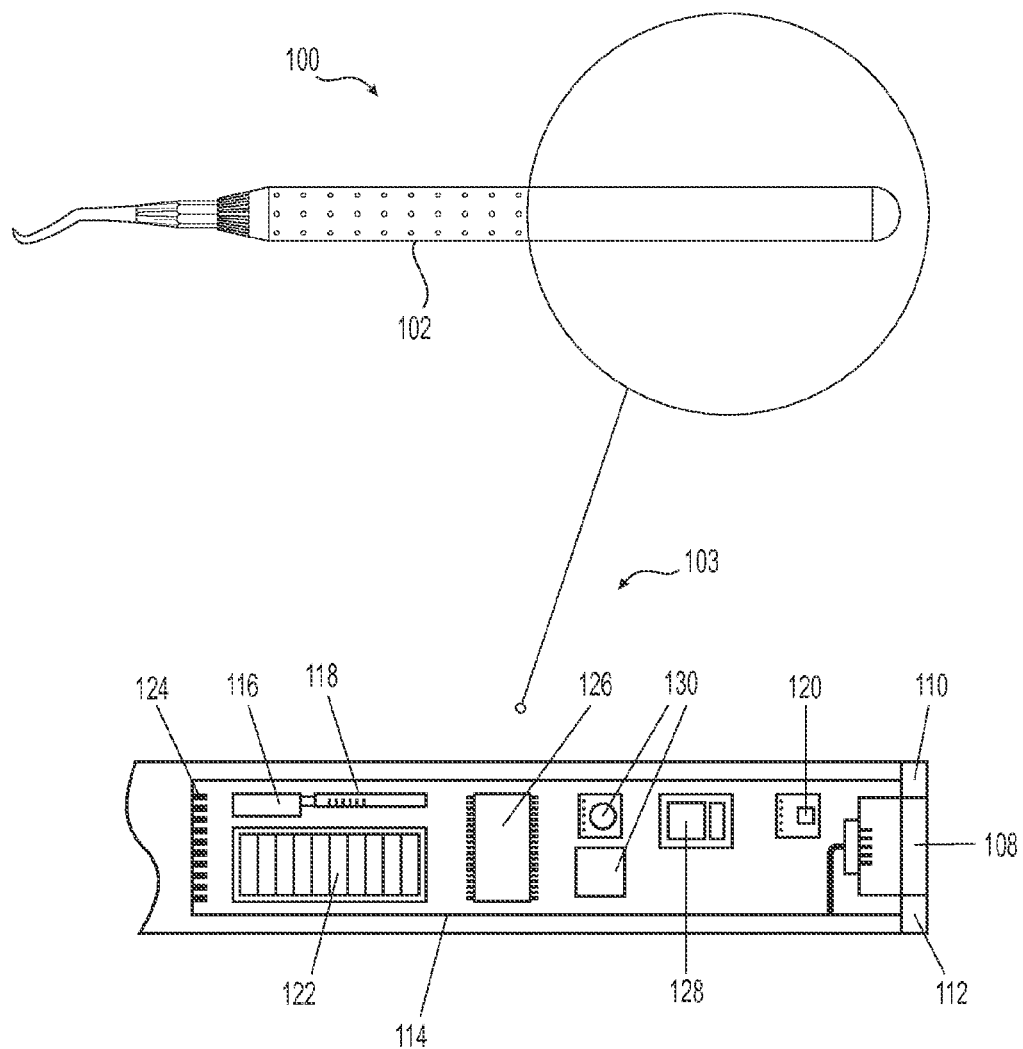
FIG. 1B is a plan view illustrating internal components of the example assembly shown in FIG. 1A.

FIG. 1B is a plan view illustrating internal components of the example assembly shown in FIG. 1A. An expanded cutaway view 103 of the device 100 shows an example printed circuit board (PCB) 114 inside the body 102. The PCB 114 includes components such as an external pressure sensor chip 116 and sensor connector pins 118 that connect the pressure sensor chip 116 to the pressure sensor membrane or area 104 illustrated in FIG. 1A. An accelerometer 120 is used to give relational positioning information such as instrument position and/or movement information. Tip sensor chips 122 acquire data via a set of tip connection pins 124 from sensors (not shown) at the fixed or interchangeable tip or working end of the device 100. A control chip 126 (e.g., a programmable read-only memory (PROM) or a central processing unit (CPU) or microcontroller) manages the flow of data and power within the device 100 and to and from the device 100. A wireless transmitter 128 transmits data to (and receives data from) another computing device associated with the user or the technology, or additional (e.g., remote) sensors (not shown). Other components 130 include, e.g., sensors of various types (e.g., tension, temperature, position, or direction), memory, and/or other circuitry to fulfill the purpose of the device and to interface with other portions of the technology. As illustrated in FIG. 1A, the PCB 114 also includes indicator LED lights 110 and 112 to visually present battery, connection, error, power, or other warnings, levels, or signals to the user, and a USB or other power or data transmission port 108 for purposes of charging a battery in the unit, and/or transmitting data to or from the device 100. Data transmission port 108 and wireless transmitter 128 allow the device to communicate with a base station (shown, e.g., in FIG. 1F) and/or a computer running a program for evaluating the user's manipulation of the device 100.

Figure 1C:
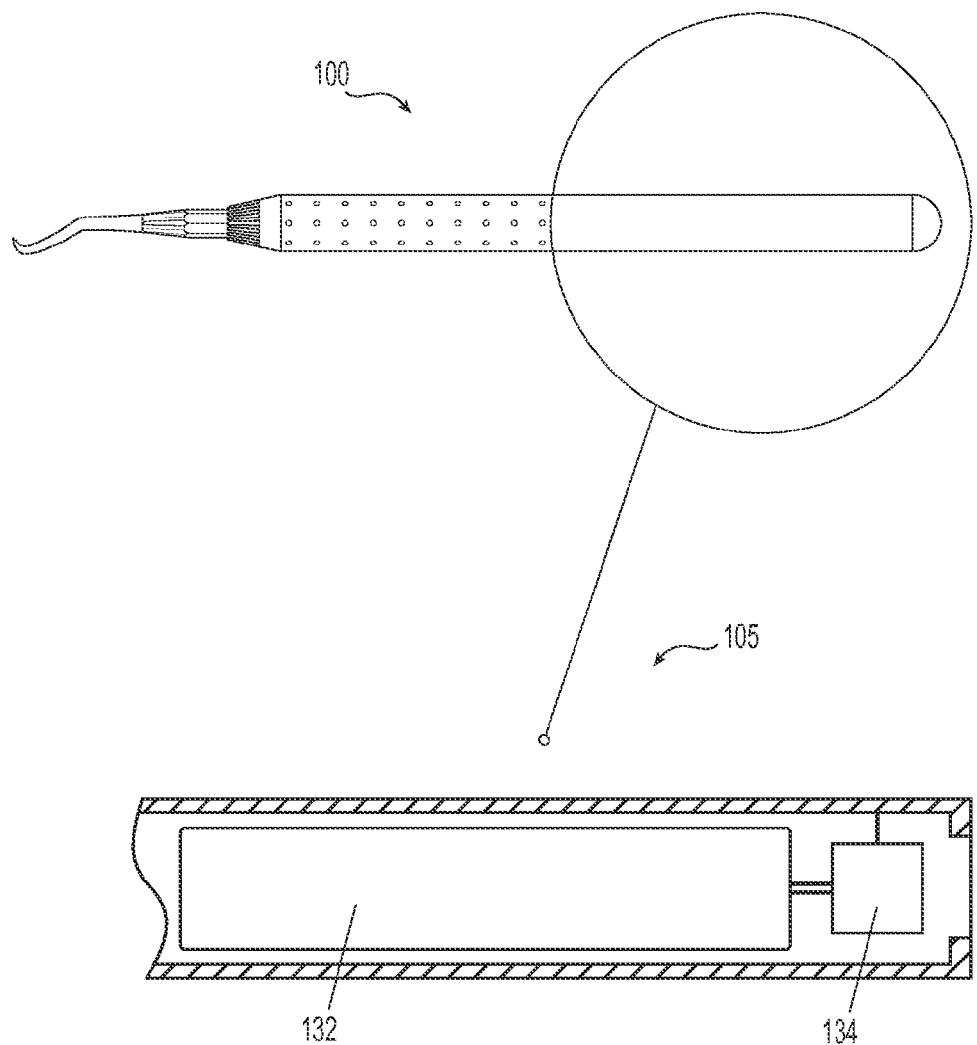
FIG. 1C is a plan view illustrating additional internal components of the example assembly shown in FIG. 1A.

FIG. 1C is a plan view illustrating additional internal components of the example assembly shown in FIG. 1A. An expanded cutaway view 105 of the device 100 shows power- and battery-related components including a battery 132

(e.g., a rechargeable lithium-ion battery) or a battery pack, and related power control or regulation circuitry 134. In the illustrated example, the battery 132 and power control or regulation circuitry 134 are located behind PCB 114.

Figure 1D:
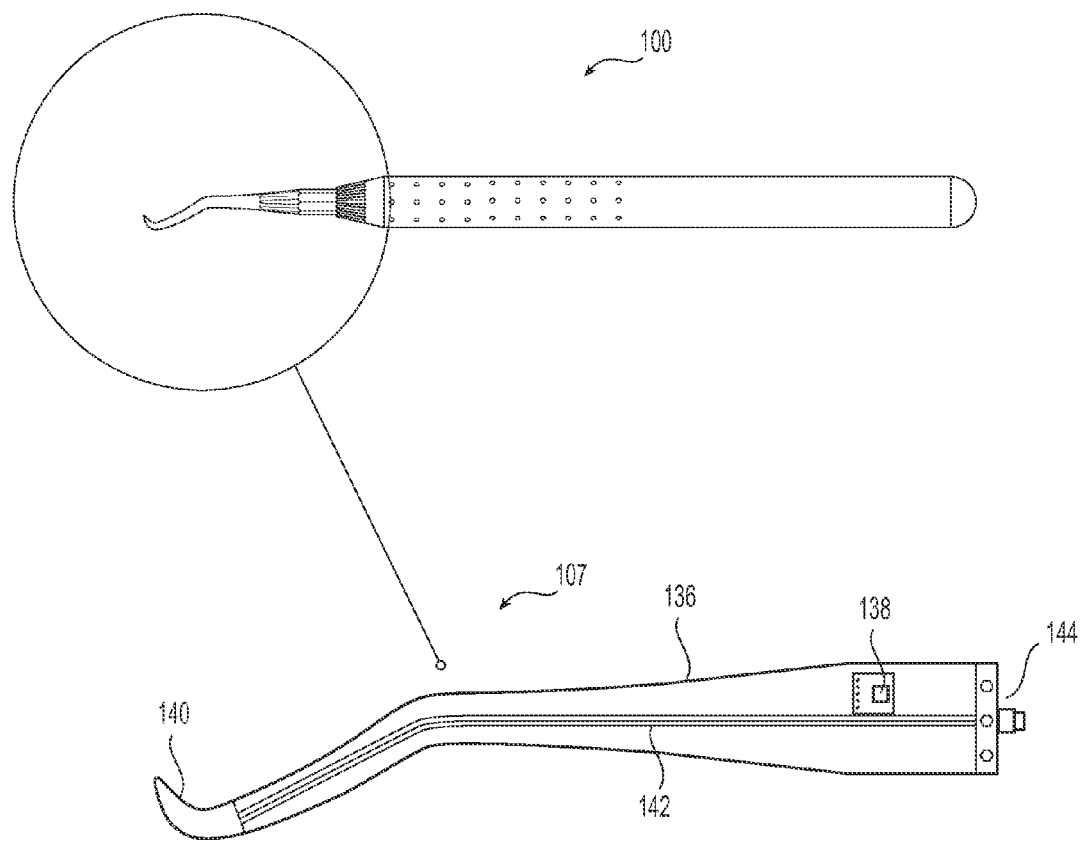
FIG. 1D is a plan view illustrating an interchangeable tip of the example assembly shown in FIG. 1A.

FIG. 1D is a plan view illustrating an interchangeable tip of the example assembly shown in FIG. 1A. The detachable tip 136 connects to the body 102 and is configured for dental hygiene educational modules. An expanded cutaway view 107 of the device 100 shows electronic components such as accelerometers, magnetometers, gyroscopes, or other positioning systems 138 within the tip 136. At the working end of the tip 136 is a sensor array 140, which is illustrated in greater detail in FIG. 4. Wires 142 connect the elements of the sensor array 140 to a physical connector 144 by which the tip 136 is attached to attachment point 106 of the body 102 as illustrated in FIG. 1A.

Using data from various internal and/or external sensors, the example handheld device 100 is able to determine grip pressure as well as the position and movement of the device 100 on several axes. The interchangeable tips 136 (in the illustrated example, tips for a dental hygiene instrument) contain a series of sensors to provide area specific information through, e.g., electrical resistance or capacitance sensors, such as an electric probe sensing an interruption in current, or any other sensor type that can provide real time feedback related to the professional training module lesson being presented to the user.

Figure 1E:
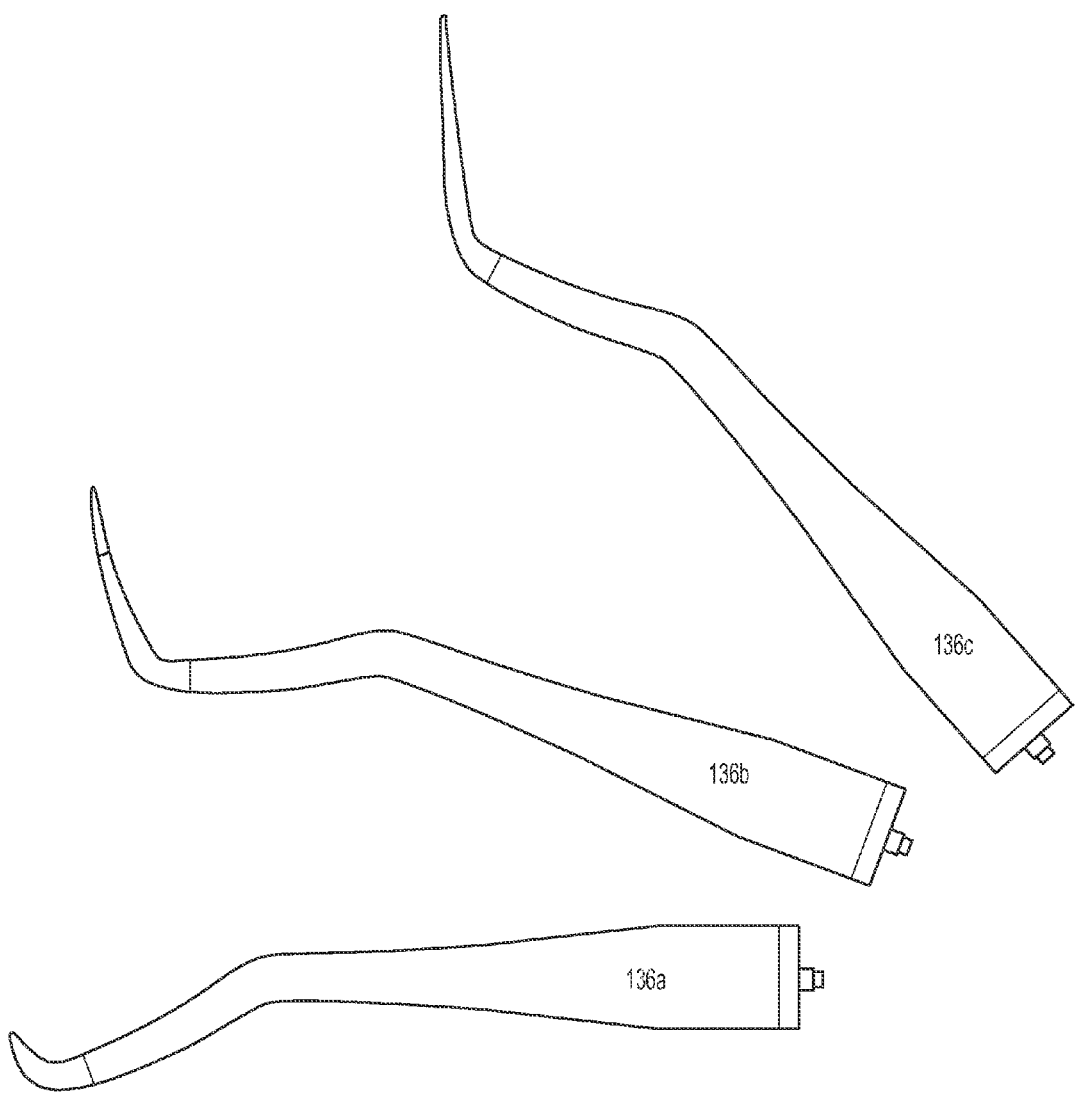
FIG. 1E is a plan view illustrating examples of interchangeable tip shapes and configurations for the example assembly shown in FIG. 1A.

FIG. 1E is a plan view illustrating examples of possible interchangeable tip shapes and configurations for the example assembly shown in FIG. 1A. Each of a number of training modules can require one or more special tips that mimic professional tools for training purposes. For example, the illustrated tips 136a, 136b, and 136c represent specific dental or periodontal tools. Each tip 136 connects to the custom input hardware body 102 as described in connection with FIG. 1D, and make use of any combination of sensors in or available to the apparatus to provide positional data to the technology to measure real time user competency during a lesson. Some tips require additional sensors, e.g., a sensor inside the handheld device body 102 as well as sensors in the tip 136 of the device 100 and/or a scanner external to the device 100 to measure accuracy with respect to the lesson being presented.

Figure 1F:
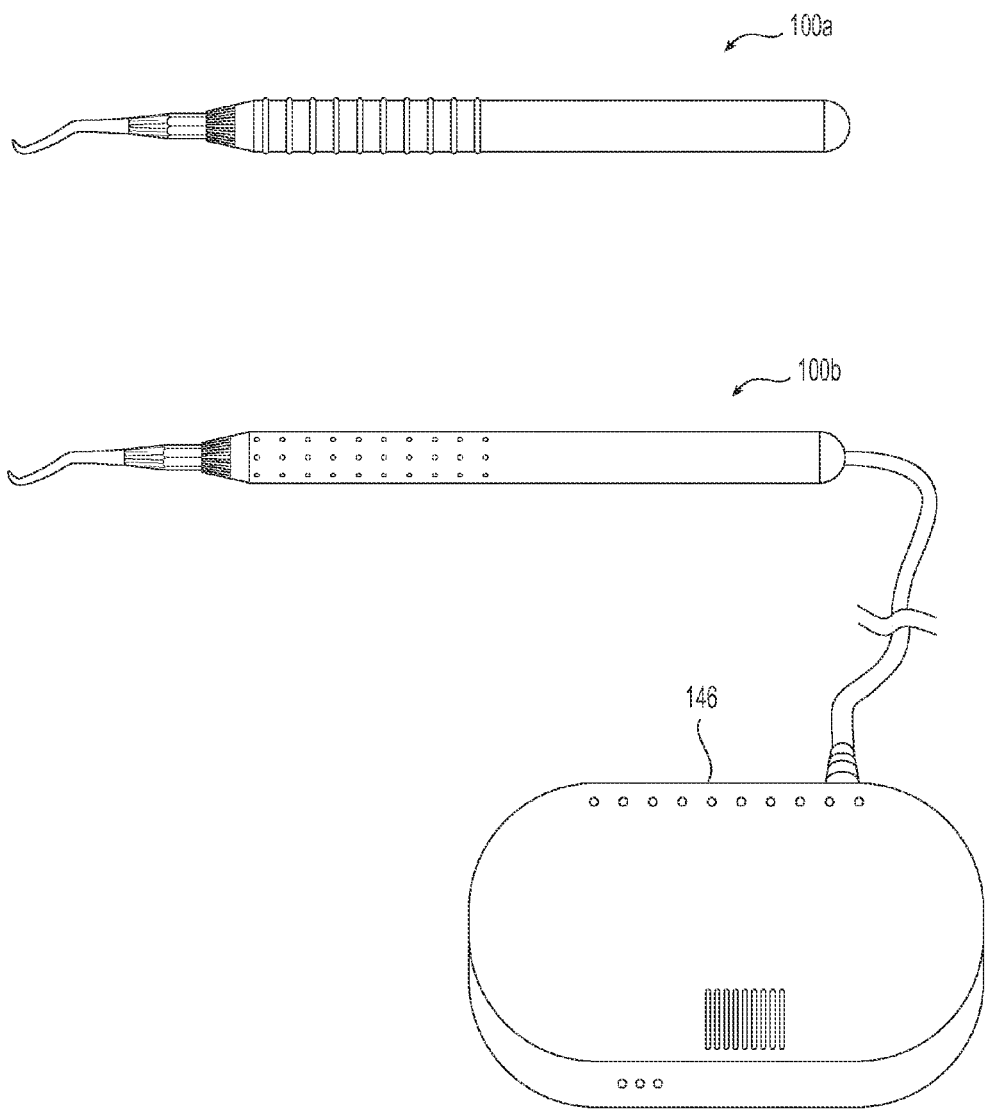
FIG. 1F is a plan view illustrating wireless and wired configurations of the example assembly shown in FIG. 1A.

FIG. 1F is a plan view illustrating wireless and wired configurations of the example assembly shown in FIG. 1A. The top device 100a is connected wirelessly to one or more other components of the technology, e.g., a user training platform (not shown), a base station 146, or other external sensors (e.g., included in the base station 146 or not shown) or internal components of the device 100a. The bottom device 100b is connected to the base station 146 and/or one or more other components of the technology via a wired connection, e.g., through data and/or power connection port 108 illustrated in FIG. 1A. Various internal components of the device 100 may be incorporated into the base station 146 to allow the device 100 to be of minimal size. The device 100 in the illustrated example (including both a wireless device 100a and a wired device 100b, whether or not via a base station 146) is connected to and communicates with a processor of a computing device (e.g., a personal computer) running instructions such as a software program for monitoring and evaluating sensor data describing the user's manipulation of the device 100 and providing feedback to the user based on the communicated data.

The base station 146 is connectable to (e.g., via a wired or wireless data connection), and communicates with, a computer executing instructions to track the user's handling of the device 100 and provide user feedback. The base station 146 may include various sensors for tracking the user's manipulation of the device 100, e.g., visual (e.g., a tracking camera), laser, radar, infrared, ultrasound, or electromagnetic field sensors. In various embodiments of the technology, the base station 146 can provide power and data to the device 100, and can include a processor to process sensor data, run lesson plan modules, and provide a self-contained secure system to receive user data and provide skill training.

Figure 2A:
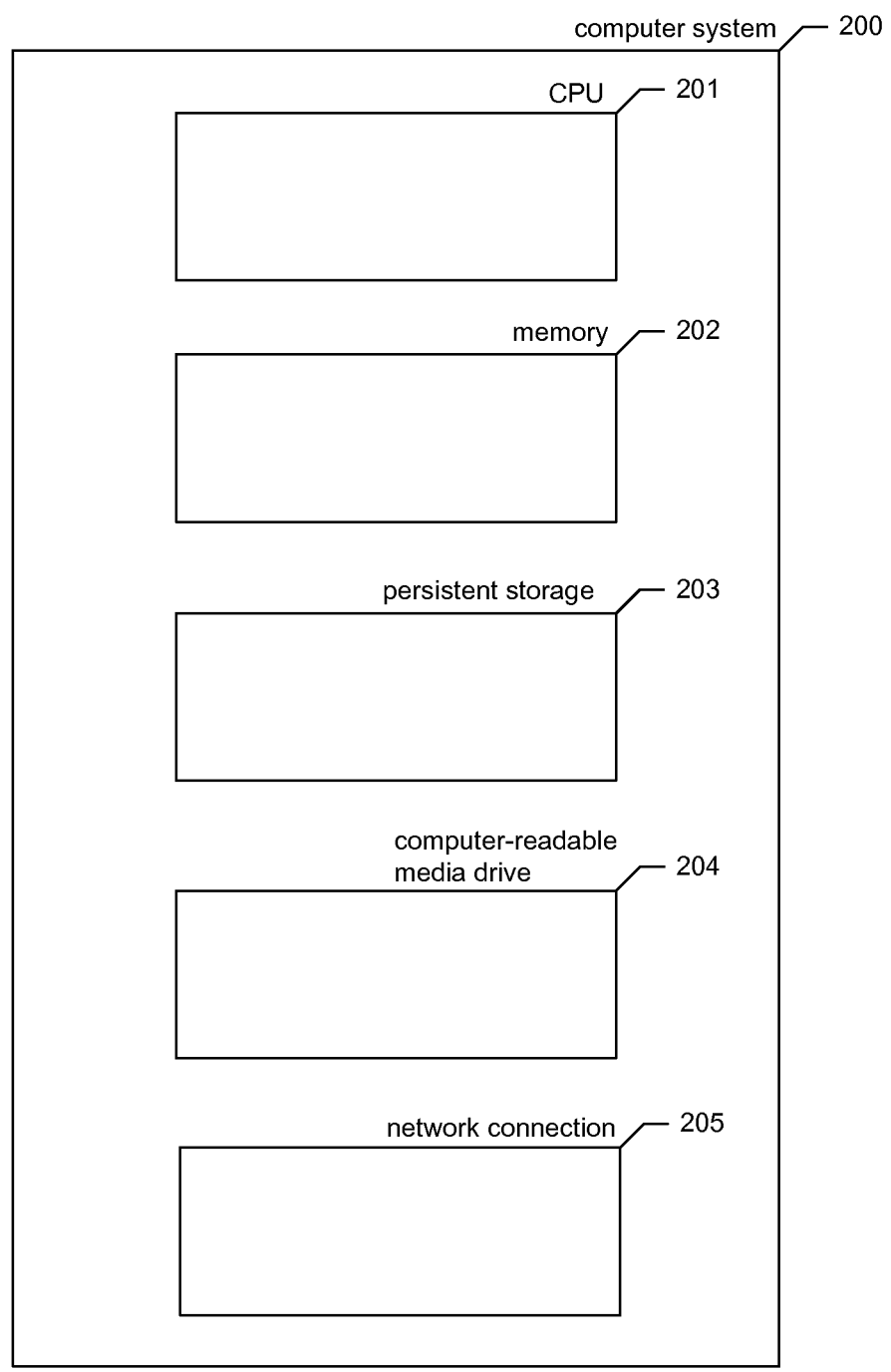
FIG. 2A is a block diagram showing components incorporated in computer systems and other devices on which the technology executes in accordance with an embodiment of the present disclosure.

FIG. 2A is a block diagram showing components incorporated in computer systems and other devices on which the technology executes in accordance with an embodiment of the present disclosure. These computer systems and devices 200 may include one or more central processing units (CPUs) 201 for executing computer programs; a computer memory 202 for storing programs and data—including data structures, database tables, other data tables, etc.—while they are being used; a persistent storage device 203, such as a hard drive, for persistently storing programs and data; a computer-readable media drive 204, such as a memory card reader or CD-ROM drive, for reading programs and data stored on a computer-readable medium; and a network connection 205 for connecting the computer system to other computer systems, such as via the Internet, to exchange programs and/or data—including data structures. The terms "memory" and "computer-readable storage medium" include any combination of temporary and/or permanent storage, e.g., read-only memory (ROM) and writable memory (e.g., random access memory or RAM), writable non-volatile memory such as flash memory, hard drives, removable media, magnetically or optically readable discs, nanotechnology memory, biological memory, and so forth, but do not include a propagating signal per se. The computing devices on which the described technology may be implemented may also include various input devices (e.g., keyboard and pointing devices) and output devices (e.g., display devices) In various embodiments, the technology can be accessed by any suitable user interface including Web services calls to suitable APIs. While computer systems configured as described above are typically used to support the operation of the technology, one of ordinary skill in the art will appreciate that the technology may be implemented using devices of various types and configurations, and having various components.

Figure 2B:
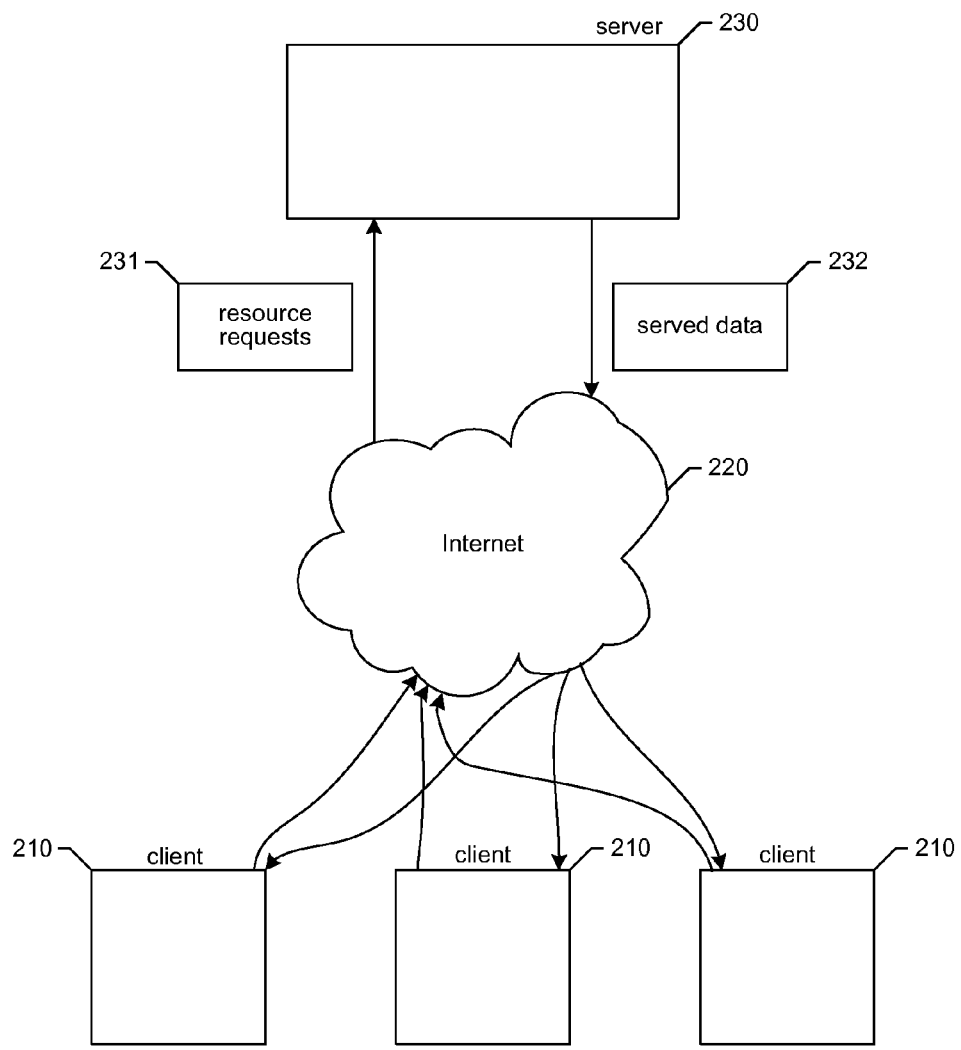
FIG. 2B is a high-level data flow diagram showing data flow in a typical arrangement of components of an embodiment of the technology.
Figure 2C:
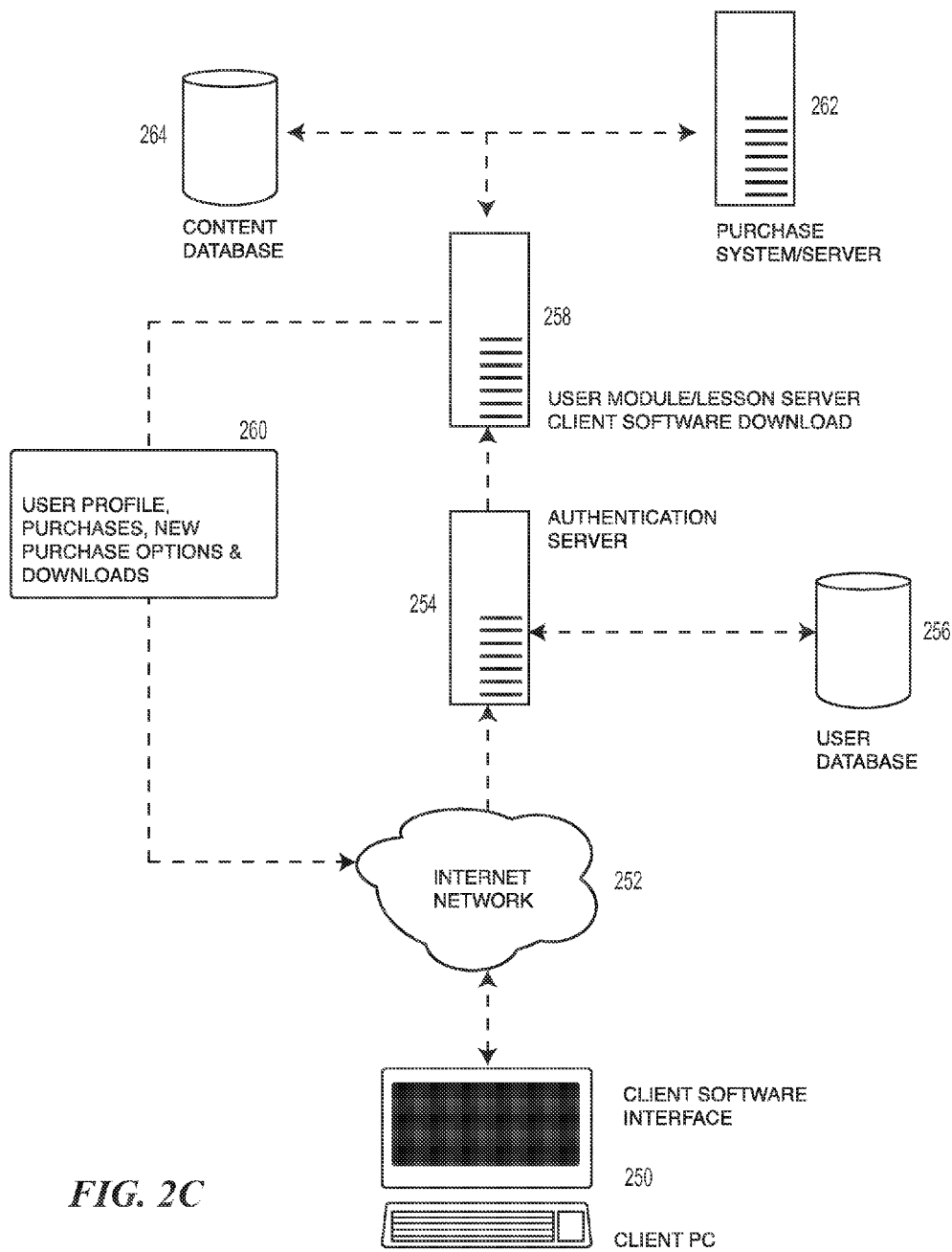
FIG. 2C is a high-level data flow diagram illustrating an example of a computing environment in which the technology may be utilized.

FIGS. 2A-2C and the discussion herein provide a brief, general description of a suitable computing environment in which the technology can be implemented. Although not required, aspects of the system are described in the general context of computer-executable instructions, such as routines executed by a general-purpose computer, e.g., a mobile device, a server computer, or a personal computer. Those skilled in the relevant art will appreciate that the technology can be practiced using other communications, data processing, or computer system configurations, e.g., hand-held devices (including tablet computers, personal digital assistants (PDAs), and mobile phones), wearable computers, vehicle-based computers, multi-processor systems, microprocessor-based consumer electronics, set-top boxes, network appliances, mini-computers, mainframe computers, etc. The terms "computer," "host," and "device" are generally used interchangeably herein, and refer to any such data processing devices and systems.

Aspects of the technology can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices that are linked through a communications network, such as a local area network (LAN), wide area network (WAN), or the Internet. In a distributed computing environment, modules may be located in both local and remote memory storage devices.

FIG. 2B is a high-level data flow diagram showing data flow in a typical arrangement of components of an embodiment of the technology. A number of client computer systems 210 that are under various users' control generate and send resource requests 231 to one or more logical servers 230 via a network such as the Internet 120, such as page requests for Web pages that include information about lesson modules provided by the technology. Within the server, these requests may either all be routed to a single server computer system, or may be load-balanced among a number of server computer systems. The server typically replies to each with served data 232. Servers 230 may include computing nodes, or such computing nodes may be remote from the servers and simply make information determined by the technology available to the servers.

Embodiments disclosed herein describe an interaction between a server and a client. It will be understood that the client could perform many of the operations described as performed by the server. Alternatively, a server could perform many of the operations described as performed by the client. Furthermore, the embodiments described herein could be performed by an application on a single device, using local data or receiving data from a network, without requiring the use of a server.

The technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, cloud based systems, virtualized systems, or distributed computing environments that may include any of the above systems or devices, and the like.

While various embodiments are described in terms of the environment described above, those skilled in the art will appreciate that the facility may be implemented in a variety of other environments including a single, monolithic computer system, as well as various other combinations of computer systems or similar devices connected in various ways including cloud computing resources. In various embodiments, a variety of computing systems or other different client devices may be used in place of the web client computer systems, such as mobile phones, personal digital assistants, televisions and associated video sources, cameras, tablet computer systems, laptop computer systems, desktop computer systems, etc.

FIG. 2C is a high-level data flow diagram to illustrate an example relationship between client software, a website, and server software. The example shows how a user can log into a website associated with the technology, download client software, and use the client to purchase, interact with, use and complete module-based lessons. The example client software system includes a locally installed software package that authenticates with a server-based application, e.g., a program that uses the Internet to allow access, to obtain, interact with and complete module based lessons. The modules include, e.g., a lesson plan that utilizes a suitable apparatus such as the device described in FIGS. 1A-1F and is completed on the user's client device 250 after the user obtains the lesson. For example, users use the client software on their personal, professional, borrowed or owned device 250 to connect (e.g., via the Internet, a local area network, a wide area network, broadband, Wi-Fi, cellular, or a point-to-point dial-up connection) 252 to a secure authentication server 254.

The server system portion of this embodiment of the technology includes a dedicated application on a hosted service through the Internet that accepts authenticated client connections. An example of this is a program installed on a user's personal device the client software connects to through the internet to verify that the user has an active account with privileges to access and obtain lesson modules. Through a secure connection the server provides the user with an authentication interface that allows the user to log in and then sort, view, start, purchase and/or interact with module based lessons. For example, when the client software is run, the server will present a screen which asks for a valid username and password prior to granting access to the secure lesson plans. This protects private user information and lesson plans from being accessed from outside sources. Access to each lesson or module may require a user to pay an annual subscription fee to access the module and/or a variable fee based on the number of credits it will reward when completed. Once the user has successfully logged in, the user will determine which module they would like to "take" via download and use.

A secure server 254 may include a remotely or locally accessed computer workstation, desktop, laptop, rack mounted server or other computing device protected from physical and/or electronic intrusion, and serves to validate the user's provided credentials against those stored in a database 256 to gain access to a computing device 258 that provides information about, e.g., the user's profile and purchases, as well as new content, modules, updates or other software packages 260 available for download. While browsing content available on this server, the user can purchase a module or other software via a third party or local purchasing service 262 and download modules or other software packages from a content storage database 264 to the local or client device 250. After the user has obtained the lesson plan he or she can interact with it while offline (not logged into the Internet) or online (logged into the Internet) to utilize and complete the lesson, allowing users to access their training material regardless of Internet connectivity.

Figure 3A:
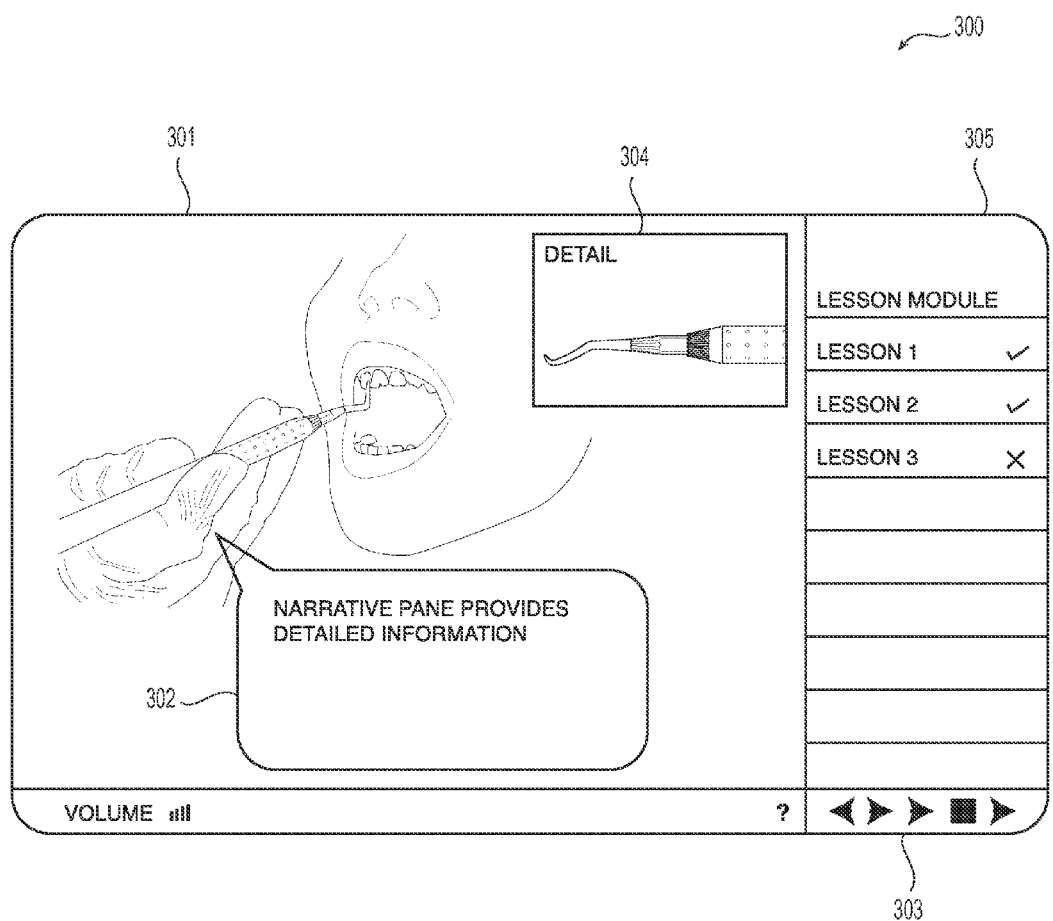
FIG. 3A is an illustration of an example lesson module user interface.

FIG. 3A is an illustration of an example lesson module user interface. Screen 300 shows different sections of a user interface that the technology can present to the user to provide a lesson in module format. The module lesson portion of this technology includes a software-generated user interface screen 300 that presents the user with a skillset building lesson plan. For example, a program window open on their personal device contains several components such as a main window 301, which presents a graphical representation of the lesson content being taught to the user, such as a tooth and instrument interacting; a narrative pane 302, which describes lesson instructions or provides contextual feedback; a navigation control set or pane 303, which provides 'back', 'forward', 'stop', 'pause', and other navigational controls to the user; a detail pane 304, which provides a graphical enhanced (e.g., 'zoomed in') look at the current lesson content; and a lesson pane 305, which provided the user with a look at current, past and future topics in the lesson they are interacting with. These lesson plans focus on real time competency feedback based training using a specialized input device (e.g., the device 100 illustrated in FIGS. 1A-1F and FIGS. 4A-4B) that is an accurate representation of the real world instrument used in the situation being practiced in the lesson module, such as a custom device designed to mimic a dental instrument. These lesson modules focus on presenting the user with a 3D model of a simulated scenario using real time feedback from a hand held device described later in this section to replicate and practice real word scenarios. Additional feedback can be provided (such as via sensors or the like) from a work piece regarding the physical engagement between the work piece and the hand held device 100. For example, the handheld device configured to replicate a dental hygiene instrument through the insertion of a simulated dental hygiene instrument tip into the input device would provide real time on screen feedback while the user adapts the hand held input device to a dental model. This provides the user with the opportunity to assess their adaptation and immediately correct errors with real time competency feedback from the described lesson module.

Figure 3B:
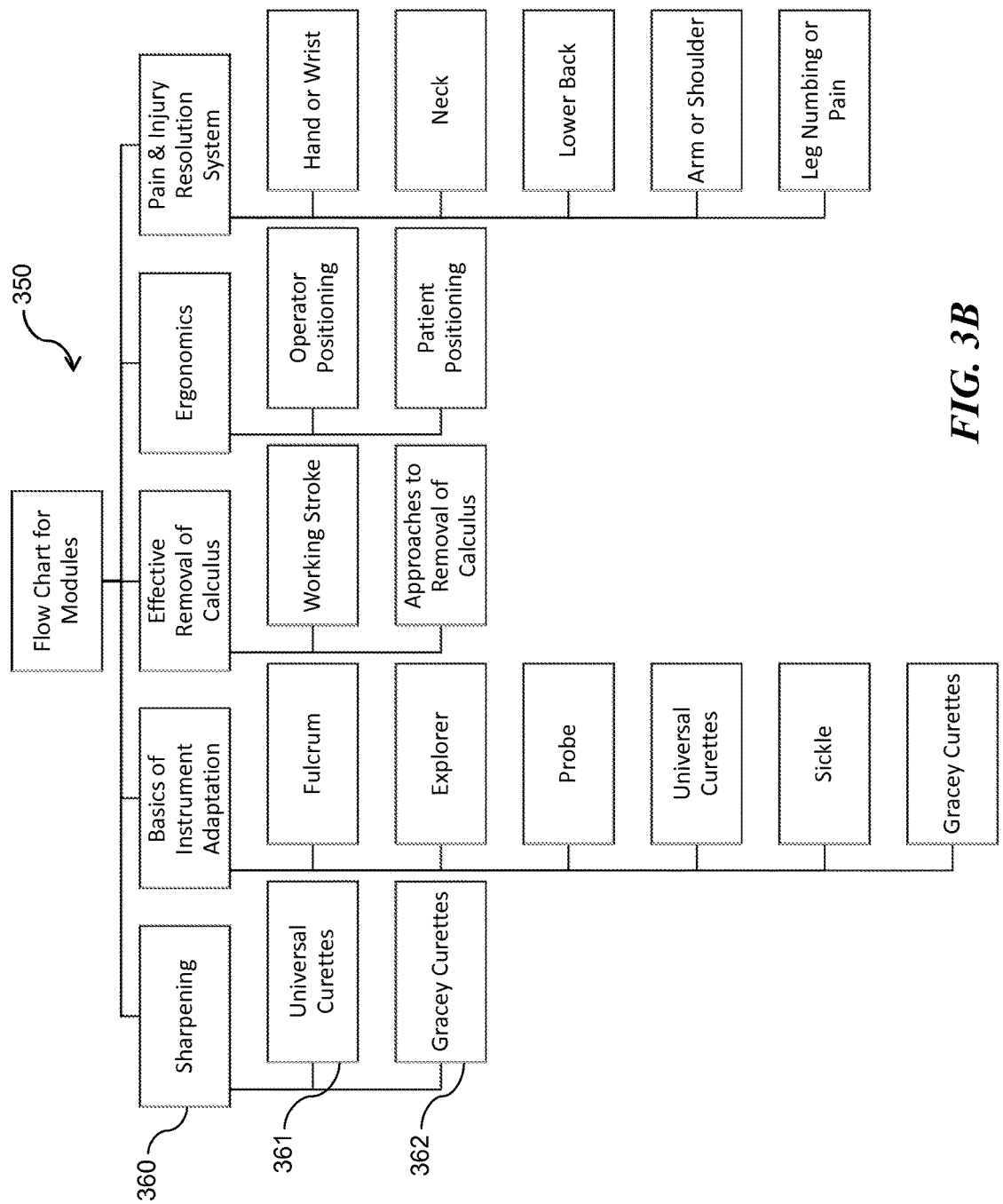
FIG. 3B is a block diagram showing modules of an example lesson plan in accordance with an embodiment of the present disclosure.

FIG. 3B is a block diagram showing modules of an example lesson plan in accordance with an embodiment of the present disclosure. Lesson plan 350 includes various lesson subjects or groupings 360 and individual lesson modules, e.g, modules 361 and 362. The modules can be broken down into, e.g., an introduction, a main lesson body, and a summary that provides a score in real time used to calculate official competency in the subject matter. The competency score generated during each lesson can grant credits towards continuing education when applicable. Once the user begins the module they will be presented with the list of expected objectives to be reached by the end of the lesson. The user will then listen and watch a video of a hygienist performing the procedure being taught. For example, modules for use of a dental explorer may cover the use of the explorer in the mouth and the correct hand position on the explorer.

The technology can present a video guide including a 3D close up of the explorer properly adapted to the tooth and the proper hand position on the tool with a narrative laying out the steps to the use of the explorer. The user is then directed to pick up the simulation device, hold it properly given a series of helpful guides, and then to adapt it to the companion tooth and use it around the circumference of the tooth. Throughout this procedure the technology assesses via the plurality of sensors whether the user is holding the instrument correctly, whether the instrument is maintaining the correct adaption to the tooth, and whether the instrument is properly engaging the tooth. If the user is not holding the instrument correctly or adapting it to the tooth properly, the system shows on the screen what the user is doing incorrectly and what to change, giving the user (or an instructor or evaluator) immediate feedback. Once the user has reached competency using the instrument the proper way, the user can move on to the next aspect or module of the lesson. The user will continue throughout the lesson plan until competency has been reached in each section and/or module. Once this complete competency has been shown, the user will be directed to sync their completed module results to the server and then given the option to complete a competency based 'test' on that module while logged into the secure server. After successfully passing this test the user can be given continuing education credits for the completed module. The technology allows the user to repeat the lesson as many times as they want, e.g., up to an assigned number of weeks or months before having to pay for the module again.

Figure 4A:
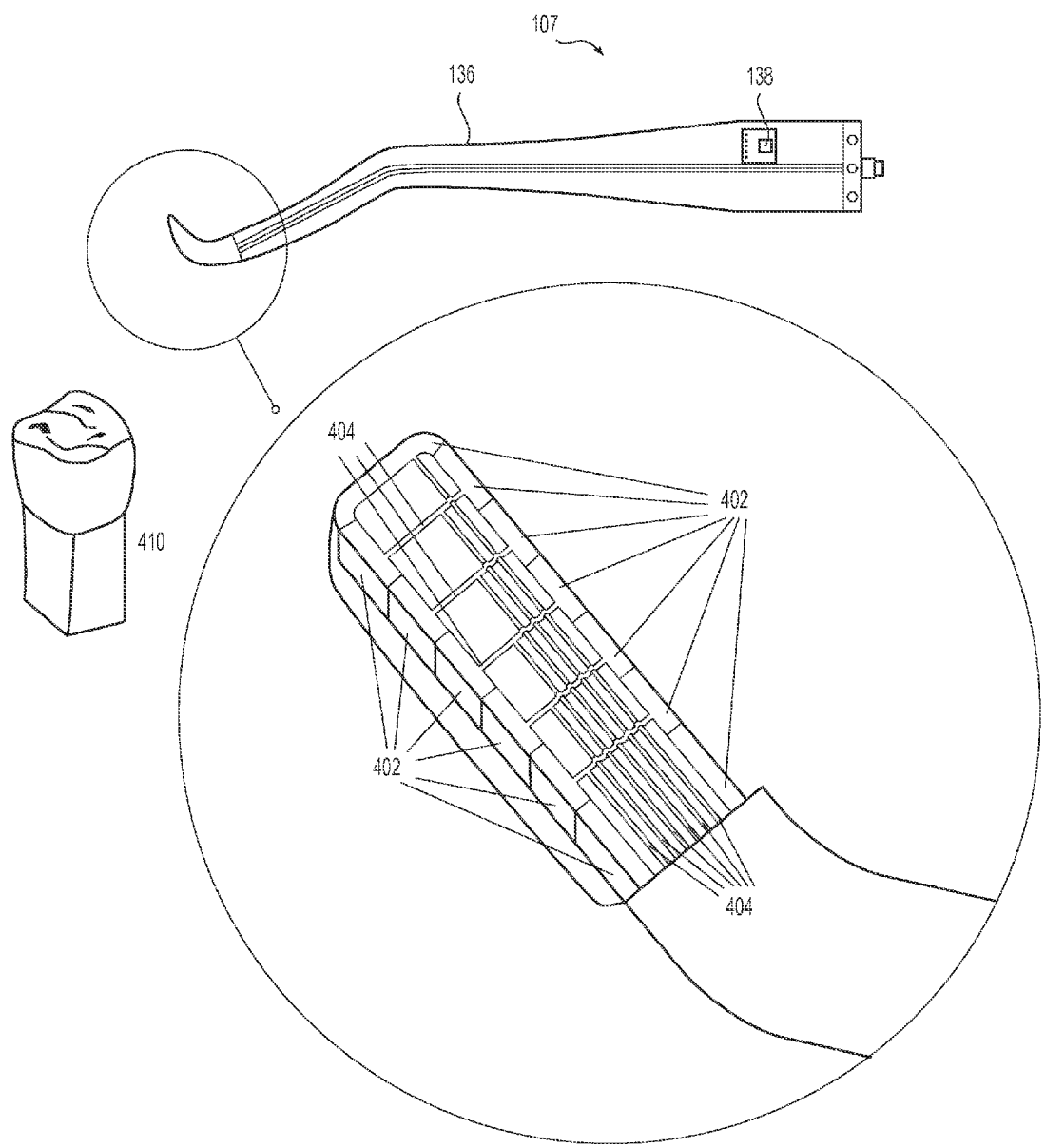
FIG. 4A is a detail view illustrating a sensor array of the example assembly tip shown in FIG. 1D.

FIG. 4A is a detail view illustrating a sensor array of the example assembly tip shown in FIG. 1D. Tip 136 is as shown in FIG. 1D's expanded cutaway view 107. The detail view shows a sensor array 402, such as a pressure sensor array or other sensor array, designed for multi zone feedback, used to provide feedback for multiple areas of a professional tool that requires varying amounts of pressure along a small area to utilize correctly. The illustrated example is adapted for use in dental hygiene education via custom tip 136 and a work piece, such as a model tooth 410. The example configuration includes a custom multi-zone sensor array 402 (a sensor which could pick up information from multiple points) utilizing electrical resistive or capacitive 'nodes' that provide feedback to differentiate between which points of the tool 'tip' have come in contact with another object via a method of a change in electrical current. The sensor array 402 allows the technology to provide real time feedback for multiple areas of a professional tool.

For example, in dental hygiene, only one to two millimeters of a given instrument are adapted to the tooth for correct instrumentation. The multi-zone sensor array 402 is configured to look like a professional tool attached as a tip 136 to a host device 100. This multi-zone sensor array 402 can include one or a series of pressure, resistive, capacitive, electrical sensitive or any other sensor modules, zones or nodes 402 which could vary in size, shape, composition alignment or material, aligned along the face of a tip 136 meant to replicate the look and feel of a real world instrument. These sensor modules, zones, or nodes, on their own or coupled with additional electronic components 138, send signals or data along traces, wiring or other connection methods 404 to a connection point 144 on the main body of the device 100 in order to establish communication to the control or program module 126 inside the main body 102 of the device 100.

This multi-zone sensor array 402 can be configured for use on its own or in conjunction with an object 410 made of a metallic or other material compatible with the sensor array on the tip (e.g., having various metallic portions to indicate the location of contact between the device 100 and the object 410). The object may be designed to stand on its own or to be inserted into an existing training apparatus to provide the sensor array a surface to detect pressure, resistive, capacitive, electrical or other sensory changes on. The object may simulate a portion of a human body. For example, when sensors of sensor array 402 come in contact with various portions of an artificial or model tooth 410 that the user is practicing on, electronic data is sent to the main body of the device 100 which transmits data (e.g., via a wired or wireless connection, or via a base station 146) to the computing device running the module lesson. The object 410 can also include sensors of various types (e.g., pressure sensors) to sense and allow the technology to determine whether the user is correctly engaging the work piece object 410. The technology translates that incoming data into a graphical representation of how well the user is performing certain tasks on the artificial tooth with the instrument simulator and provides interactive feedback to the user on which adjustments to make in their techniques. For example, the technology may use the model tooth 410 to teach and evaluate a user regarding skills for detection of caries, removal of calculus, and exploration of pocket or tooth characteristics, for drilling and/or doing fillings or other restorative procedures, or for oral surgery skills (using devices 100 in the form of various dental tools, e.g., a dental drill). Other types of models can be used to teach, e.g., the administration of anesthetic or surgical skills for various portions of the human body.

Figure 4B:
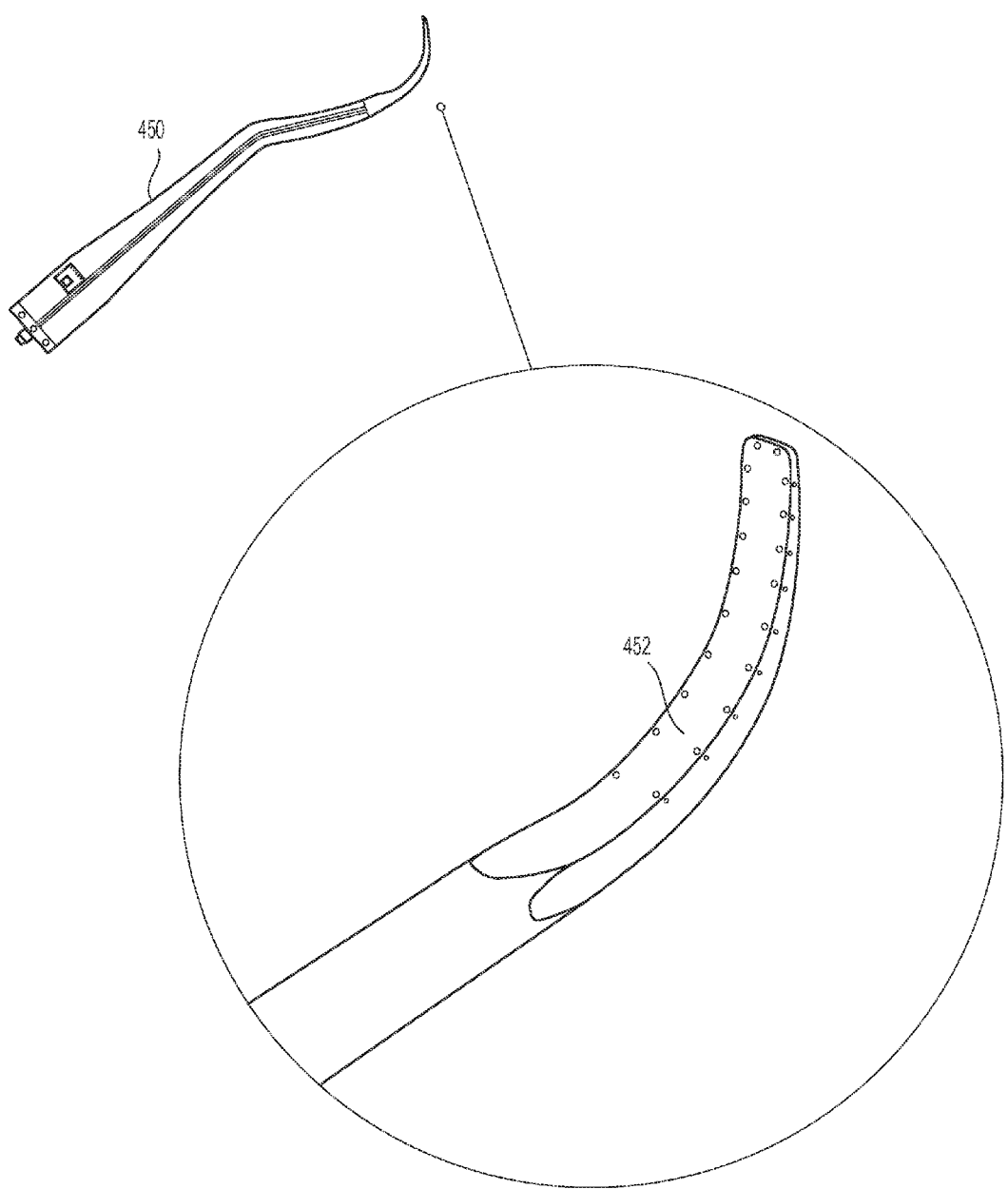
FIG. 4B is a detail view illustrating a sensor array of another example assembly tip.
Figure 5D:
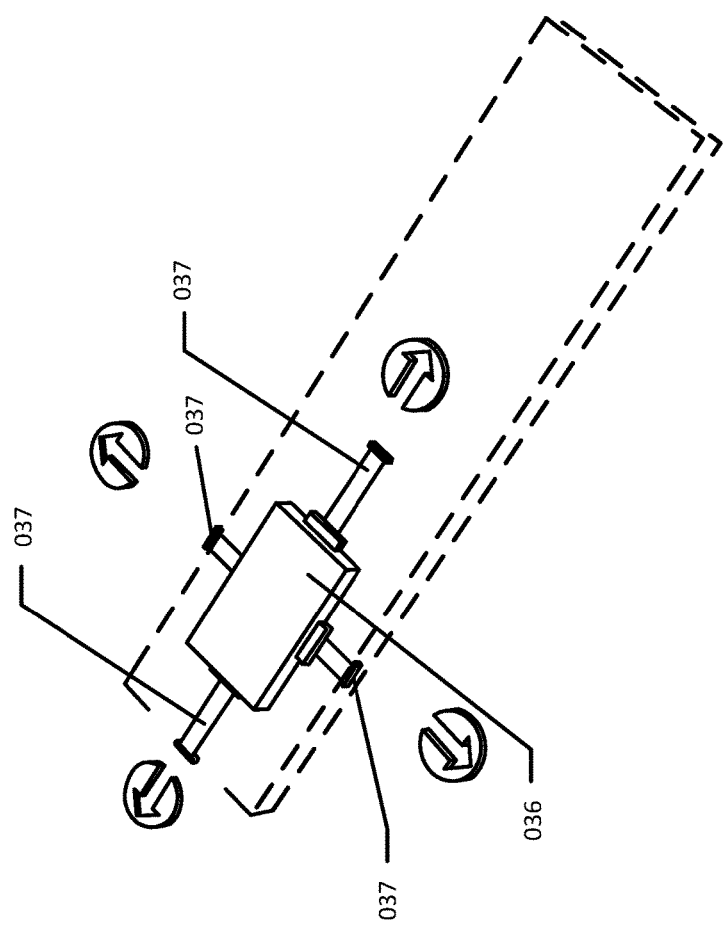
FIG. 5D is a schematic isometric view illustrating an embodiment of the instrumented work piece in accordance with an embodiment of the present disclosure.

FIG. 4B is a detail view illustrating a sensor array of another example assembly tip. The tip 450 contains components similar to tip 136 but has a different shape to resemble a different tool. The tip 450 may contain different types and/or arrangements of sensors 452 for sensing and testing different skills.

Various embodiments of the technology include devices 100 of different forms than the dental tools illustrated in the Figures. For example, the device 100 could resemble a surgical tools such as scalpels, forceps, or anesthetic injection needles. The device 100 could be in the form of an interface for laparoscopic, robotic, or remote surgery. It could also include, e.g., haircutting implements such as scissors, to train individuals to handle such implements in ways that promote proper and efficient use of the implements. In some embodiments, the device 100 is built to resemble or be a non-medical or -dental tool related to other fields or professions, to teach a user how to hold and use the tool correctly.

FIGS. 5A-5D illustrate an instrumented work piece 510 useable with the handheld tool or device 100 (FIGS. 1A-1F) in accordance with an embodiment of the present technology. In this embodiment, the instrumented work piece 510 is an instrumented case, covering or apparatus to hold an existing, prop or integrated tool. This case, covering, or apparatus contains sensors, sensor hardware, and related circuitry which provides positional, relational, pressure or other sensory data to gauge positional, relational or other adaptation of the work piece, such as relative to a handheld device 100 or other existing tool, prop or training device usable with the instrumented work piece 510, so as to provide feedback to the user, host device or other receiver. The illustrated embodiment is adapted for use in dental hygiene education configuration via an instrumented work piece 510 configured as a sharpening surface or 'stone' used with a handheld device (i.e., the real or simulated tool "being sharpened) to provide real time and/or subsequent feedback to the user about the position of their sharpening stone relative to the handheld device to ensure a proper angle while sharpening.

In order to interface with the training modules, including the handheld tools or devices 100, described in this disclosure, or provide self-contained feedback to the user, the user can use the instrumented work piece 510, such as an instrumented case, covering or apparatus 036 (FIG. 5A), which can vary in size and shape depending on the professional training being provided, providing feedback in a standalone capacity via visual or audio indicators, or connected electronically, either wirelessly or wired, to a training platform described as any computer laptop, desktop, station, terminal, tablet, phone or other personal computing device. This instrumented work piece 510 could also act in a self-contained manner providing feedback about position to the user through visual, auditory or other interfaces. The instrumented work piece 510 comprises of several main components, such as an interchangeable casing made up of either metal, plastic, rubber or other material with a recess, arms, or other retention mechanism(s) (037) to hold a professional accessory or tool, such as a sharpening stone, and any internal components or any combination thereof.

In the illustrated embodiment, the instrumented work piece 510 includes a case, cover, or apparatus formed as a plastic shell designed to hold a dental or to hold or hold onto an instrument sharpening 'stone' with specialized electronic sensor data components contained therein used in a profession which the user is training under such as a dental hygiene.). In this embodiment, the case contains a main control board (038) (PCB) and related components (FIGS. 5B and 5C). These related components can include sensors or sensor connectors such as accelerometers, gyroscopes or other sensor technology, (039) usable to determine and provide relational positioning information of an engaging hand held tool or other training instrument, such as the position, orientation, angle or rotation, a wireless transmitter (040) such as a Bluetooth™ module, which will transmit all data to the user's laptop, desktop, tablet, PC or microprocessor device it is paired with or connected to, a rechargeable battery and related control or regulatory circuitry (041), all related circuitry and PROM (or 'CPU') control chips (042) and any other sensor, positional, memory or other circuitry (043) required to fulfil the intention of the device and provide feedback to the user or interface with user's laptop, desktop, tablet, PC or microprocessor device it is communicating or attempting to establish communication with, indicator LED lights (044) to visually present battery, connection, error, power, positional or other warnings, levels or signals to the user, and a USB or other power or data transmission port (045) for purposes of charging a battery in the unit, or transmitting data to or from the device. In other words, the instrumented work piece 510 of the illustrated embodiments is configured to hold a dental sharpening stone, and indicate to the user, either via contained visual, audio or other signals such as the LEDs, or via software on a connected device, when a user is holding it in the 'correct' position determined relative to the tool or instrument "being sharpened, via comparing orientation and positional information from the sensors in the case to either software or firmware expectations either in the device or on a connected computer. This data, information and associated feedback will serve to provide the user immediate, real time feedback for competency or accuracy in the skillset they are practicing in the module lesson or simply checking to see if they are sharpening their instruments correctly.

In an embodiment, the apparatus may be used to sharpen a knife. The sharpening stone may be held against the apparatus. Assuming the knife is held substantially perpendicular to the ground, the sharpening stone may be held at a suitable angle to the knife. For example, the stone may be held at an angle to the knife within a range of 15 to 25 degrees, within a range of 16 to 24 degrees, within a range of 16 to 23 degrees, within a range of 17 to 23 degrees, within a range of 17 to 22 degrees, within a range of 17 to 21 degrees, or within a range of 17 to 20 degrees. Other ranges are possible and may be considered within the scope of the present disclosure.

The work piece 510 may be affixed to the sharpening stone such that its angle relative to the knife is the same as the sharpening stone. The work piece 510 calculates its angle relative to the knife and drives a perceptible indication of when the angle falls within a given range. Optionally, the work piece 510 may indicate when the angle falls outside of given range. In another alternative, a specific angle may used and the work piece 510 determines when it is being held at the specific angle (as opposed to within a range), or when it is not being held at the specific angle (as opposed outside of a range).

From the foregoing, it will be appreciated that specific embodiments of the technology have been described herein for purposes of illustration, but that various modifications may be made without deviating from the spirit and scope of the technology. Further, certain aspects of the technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various examples described above can be combined to provide further implementations of the disclosure. Some alternative implementations of the disclosure may include not only additional elements to those implementations noted above, but also may include fewer elements.

These and other changes can be made to the disclosure in light of the above Detailed Description. While the above description describes certain examples of the disclosure, and describes the best mode contemplated, no matter how detailed the above appears in text, the disclosure can be practiced in many ways. Details of the system may vary considerably in its specific implementation, while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

To reduce the number of claims, certain aspects of the disclosure are presented below in certain claim forms, but the applicant contemplates the various aspects of the disclosure in any number of claim forms. For example, while only one aspect of the disclosure is recited as a computer-readable memory claim, other aspects may likewise be embodied as a computer-readable memory claim, or in other forms, such as being embodied in a means-plus-function claim. (Any claims intended to be treated under 35 U.S.C. § 112(f) will begin with the words "means for", but use of the term "for" in any other context is not intended to invoke treatment under 35 U.S.C. § 112(f).) Accordingly, Applicants reserve the right to pursue additional claims after filing this application to pursue such additional claim forms, in either this application or in a continuing application.

We claim:

1. An apparatus comprising:
   a case that holds a sharpening stone;
   at least one sensor contained in the case that detects an angular position of the sharpening stone;
   a processing system contained in the case that compares the angular position to a range of suitable angles; and
   an indicator device to perceptibly indicate to a user when the sharpening stone is held within the range of suitable angles.

2. The apparatus of claim 1, wherein the case is configured to interface with an external computing device.

3. The apparatus of claim 1, wherein the indicator device is contained in the case.

4. The apparatus of claim 1, wherein to be held within the range of suitable angles, the case is held manually.

5. The apparatus of claim 1, wherein the range of suitable angles comprises angles between 15 to 25 degrees.

6. The apparatus of claim 1, wherein the indicator device emits visual signals.

7. The apparatus of claim 1, wherein the indicator device emits audio signals.

8. The apparatus of claim 1, wherein the at least one sensor comprises at least one of an accelerometer, a gyroscope, and a magnetometer.

9. A method for performing tool sharpening comprising:
   detecting an angular position of a sharpening stone; and
   driving an indicator device to perceptibly indicate to a user when the sharpening stone is held within a range of suitable angles.

10. The method of claim 9, wherein the sharpening stone is contained in a case comprising at least one sensor that detects the angular position of the sharpening stone.

11. The method of claim 10, wherein the at least one sensor comprises at least one of an accelerometer, a gyroscope, and a magnetometer.

12. The method of claim 10, wherein the indicator device is contained within the case.

13. The method of claim 10, wherein to be held within the range of suitable angles, the case is held manually.

14. The method of claim 9, wherein the range of suitable angles comprises angles between 15 to 25 degrees.

15. The method of claim 9, wherein the indicator device emits visual signals.

16. The method of claim 9, wherein the indicator device emits audio signals.

\* \* \* \* \*